United States Patent [19]

Gardner

[11] 3,780,620
[45] Dec. 25, 1973

[54] PRESSURE DIFFERENTIAL ASSIST FOR A SERVOMOTOR
[75] Inventor: Delbert J. Gardner, South Bend, Ind.
[73] Assignee: The Bendix Corporation, South Bend, Ind.
[22] Filed: Nov. 13, 1972
[21] Appl. No.: 306,265

[52] U.S. Cl.............................. 91/6, 91/376, 60/404
[51] Int. Cl........................ F01b 25/02, F15b 9/00
[58] Field of Search............................ 91/6, 5, 376; 60/404

[56] References Cited
UNITED STATES PATENTS
3,353,451  11/1967  Garrison et al. ........................... 91/6
3,434,388  3/1969  Julow et al. ............................... 91/6
3,633,363  1/1972  Larsen ...................................... 91/6
3,410,179  11/1968  Kytta et al. .............................. 91/376
2,934,903  5/1960  Hupp et al. .............................. 60/404

Primary Examiner—Martin P. Schwadron
Assistant Examiner—A. M. Zupcic
Attorney—Leo H. McCormick, Jr. et al.

[57] ABSTRACT

A control for sequentially operating a pressure differential servomotor with air at atmospheric pressure and air above atmospheric pressure in response to an input force for developing an output force to energize an intensifying device to supply a braking system with pressurized fluid.

7 Claims, 1 Drawing Figure

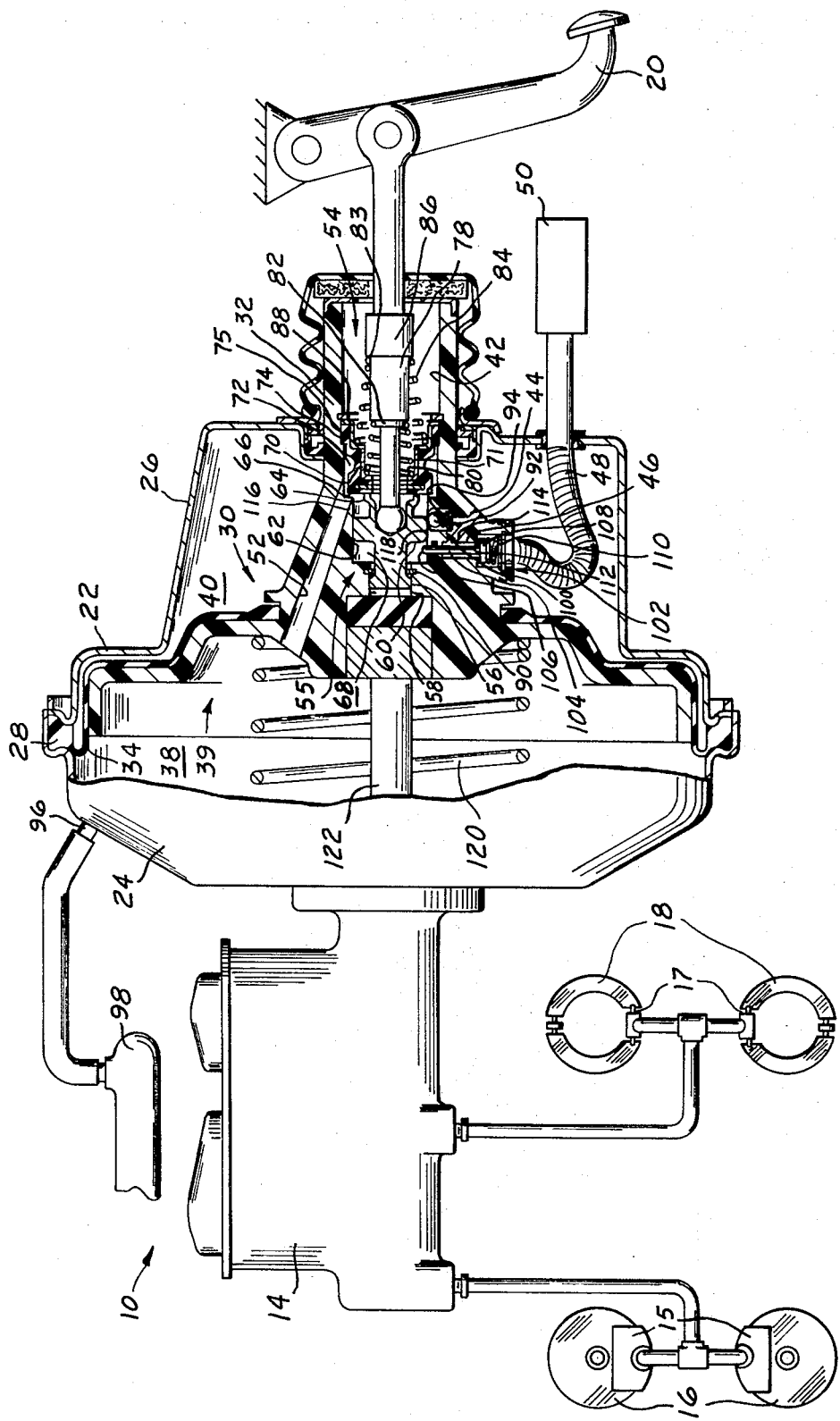

PRESSURE DIFFERENTIAL ASSIST FOR A SERVOMOTOR

BACKGROUND OF THE INVENTION

The engines of automobiles presently manufactured in the United States of America are required to have emission control apparatus in an attempt to reduce air pollution. However, most emission control apparatus reduce the level of vacuum developed at the intake manifold and as a result the pressure differential between such vacuum and air at atmospheric pressure utilized for operating a servomotor powered braking system is correspondingly also reduced.

Under test conditions it has been determined that even with this reduction in vacuum, the resulting vacuum/air pressure differential is normally adequate for developing a sufficient pressure in the braking system to stop a vehicle within existing safety standards. However, during panic stops and on stops on steep uphill grades the available vacuum/air pressure differential has occasionally been inadequate to bring the vehicle to a stop within the safety standards.

SUMMARY OF THE INVENTION

Realizing that each brake application will not require an additional source of air pressure above atmospheric pressure to create an adequate pressure differential with the available vacuum, I have devised a control means for a servomotor to create a pressure differential between the available vacuum an/or air at atmospheric pressure and/or air above atmospheric pressure. The control means is secured to the wall of the servomotor which separates a front chamber from a rear chamber. A hub means of the control means has an axial bore in a rearward projection which extends through the rear shell. The axial bore is opened to the atmosphere and is in communication with the rear chamber through a first passage and the front chamber through a vacuum passage in the hub means. A second passage in the hub means connects a source of air above atmospheric pressure to the first passage. A first valve means located in the first passage controls communication with the axial bore while a second valve means located in the second passage controls communication with the first passage. A plunger means located in the axial bore responsive to an operator in a first position freely allows communication of the rear chamber with the front chamber through the vacuum passage by opening the first valve means. In a second position the plunger terminates the communication of the vacuum chamber and allows air at atmospheric pressure to flow past the first valve means into the rear chamber through the first passage to develop an operational pressure differential across the wall means, and in a third position the plunger engages the second valve means to allow air above atmospheric pressure to flow into the rear chamber through the first passage. The operator through an input force moves the plunger means to the desired position to meet the existing braking demand.

In addition if the supply of air above atmospheric pressure is unavailable, the operator will have a power assist in the second position. Conversely in the event of a vacuum hose rupture there is a power assist in the third position between air above atmospheric pressure in the rear chamber and air at atmospheric pressure in the front chamber.

It is, therefore, an object of this invention to provide a braking system with a servomotor having control means for sequentially communicating a power chamber with air at atmospheric pressure and air above atmospheric pressure to create a pressure differential across a wall means to develop an output force to satisfy a braking demand.

It is a further object of this invention to provide a servomotor which is capable of being operated by a pressure differential created by vacuum and atmospheric air pressure, vacuum and air above atmospheric pressure, and air at atmospheric pressure and air above atmospheric pressure.

It is still another object of this invention to provide a servomotor with a position responsive plunger means moved by an operator to supply an intensifying device with an output force to pressurize a fluid to operate a braking system. These and other objects will become apparent from reading this specification and viewing the drawing

BRIEF DESCRIPTION OF THE DRAWINGS

The drawing shows a schematic of a braking system with a servomotor having a control means for selectively providing an operational pressure differential with a supplementary fluid pressure to intensify the operational pressure to meet an operational demand.

DETAILED DESCRIPTION OF THE PREFERRED EMBODIMENT

The braking system 10 for a vehicle shown in the drawing has a servomotor means 12 connected to a master cylinder or fluid pressure intensifying device 14 for supplying pressurized hydraulic fluid to wheel cylinders 15 of the front brakes 16 and to wheel cylinders 17 of the rear brakes 18 in response to an operator input on the brake pedal 20.

In more particular detail, the servomotor means 12 has a housing 22 formed by a front shell 24 joined to a rear shell 26 by a twist lock connection 28. A hub means 30 located in the housing 22 has a rearwardly extending projection 32 which extends through and is slidably retained in the rear shell 26. The hub means 30 is secured to a diaphragm 34 of a wall means 39 which has its outer periphery 36 retained by the twist lock connection 28 to separate the interior of the housing 22 into a front chamber 38 and a rear chamber 40. The hub means 30 has an axial bore 42 therein. The hub means 30 has a first passage 44 which connects the bore 42 with the rear chamber 40, a second passage 46 which connects the rear chamber 40 with a source of air above atmospheric pressure through flexible coupling 48 in the flow path of the emission control pump 50 of the type disclosed in U. S. Patent Application Ser. No. 294,131, filed Oct. 2, 1972, incorporated herein by reference, and a third passage 52 which connects the bore 42 with the front chamber 38. A control valve means 54 has a plunger means 55 located in the internal bore 42 which has a first land 56 retained in a first guide surface 58, an actuation land 60 retained in a first step 62 of the axial bore 42 and a rearwardly facing annular atmospheric valve seat 64. The valve seat 64 is adapted to abuttingly seat on a flexible annular poppet member 66 to form a control chamber 68 in the bottom of the axial bore 42. The annular rubber poppet member 66 surrounds a matching tube 70 which transmits an actuation force to seat the poppet member 66. The poppet member 66 has an integral flexible diaphragm portion 72 with a radial outer periphery 74 which is enlarged for sealing engagement with the larger diameter portion 75 of the axial bore 42. The rubber poppet member 66 is biased against the atmospheric valve seat 64 by a coil spring 71 which surrounds the push rod 78 and is interposed between a flange 80 on tube 70 and a shoulder 82 on the push rod 78. The control valve means 54 is retained in a first position, as shown in the drawing, by a return spring 84, positioned between a retainer 86 held on the push rod 78 by the shoulder 82 and an annular washer 88, which biases the outer thickened position or radial periphery 74 into sealing engagement with the sidewalls of the bore portion 75. The return spring 84 moves land 56 of the plunger means 55 against a stop means 90 to allow vacuum communication from the front chamber 38 into the control chamber 68. In this first position, the actuation land 60 will act on ball 92 of the first valve means 100 located in the first passage 44 by compressing spring 94 to allow any air in the rear chamber 40 to be evacuated by passing through the check valve 96 and being dumped into the exhaust manifold 98 of the engine.

The second valve means 102 located in the second passage 46 has a stem 104 which extends through the hub means 30 into the control chamber 68 between the keeper or stop means 90 and the actuation land 60. The stem 104 has a beveled head 106 on an end thereof located in the control chamber 68 and an annular face 108 on an other end located in the second passage. A spring 110 urges the annular face 108 against a seat 112 to prevent air above atmospheric pressure from passing into the first passage 44 through connecting passage 114.

MODE OF OPERATION OF THE PREFERRED EMBODIMENT

Upon an operator desiring to stop a vehicle, an input force will be applied to brake pedal 20 causing push rod 78 to move the control valve means 54 in the axial bore 42 by overcoming the return spring 84 permitting spring 71 to move the annular rubber poppet member 66 against a seat 116 to close vacuum communication with the control chamber 68. Simultaneously with the movement of the push rod 78 the actuation land 60 of the plunger means 55 is moved out of contact with ball 92 allowing spring 94 to move ball 92 onto seat 118 and momentarily seal the vacuum in the rear chamber 40.

Further movement of the plunger means 55 to a second position in response to the actuation input force will move the atmospheric valve seat away from the poppet member 66 to allow air at atmospheric pressure into the control chamber 68. With air at atmospheric pressure in the connrol chamber and vacuum in the rear chamber 40, an actuation pressure differential will be created across the resiliently seated ball 92. This actuation pressure differential will move the ball 108 away from seat 118 allowing air at atmospheric pressure to flow into the rear chamber 40 and create a corresponding operational pressure differential across the diaphragm 34 of the wall means 39. This operational pressure differential will overcome the return spring 120 allowing the wall means 39 to move and transmit an output force through the hub means 30 to the push rod 122 connected to the master cylinder 14.

Upon further movement of the plunger means 55 to a third position, the actuation land 60 will contact the beveled head 106 to move the annular face 108 away from seat 112. The beveled head will provide a control to regulate the flow of air above atmospheric pressure from the second passage 46 through connection 114 into the first passage 46 and into the rear chamber 40 to reinforce the operational pressure differential created with the vacuum communicated in the front chamber 38 from the manifold. Upon air above atmospheric pressure being communicated to the first passage 44, a pressure differential will again be created with air at atmospheric pressure in the control chamber 68 allowing spring 94 to urge ball 108 onto seat 118 and prevent any of the air above atmospheric pressure from escaping into the atmosphere through the bore 42.

Upon release of the brake pedal 20, return spring 84 will move the actuation land 60 out of contact with the beveled head 106 and into contact with ball 92 simultaneously with the seating of atmospheric valve seat 64 on the poppet member 66 and the unseating of the poppet 66 front seat 116 to again allow vacuum to evacuate the air from the rear chamber 40 past the first valve means 100.

In the event that vacuum is unavailable to be supplied to the front chamber 38, upon the operator moving the plunger means 55 to the third position, as described above, air above atmospheric pressure will be communicated from the second passage 46 into the first passage 44 and into the rear chamber 40. With air at atmospheric pressure in the front chamber 38 and air above atmospheric pressure in the rear chamber an operational pressure will be created across the wall means 39 to provide an operator with a power assist in activating the master cylinder 14. This backup pressure differential will assure an operator of a power supply in braking a vehicle in response to a stopping requirement.

I claim:

1. In a servomotor having a wall means separating a front chamber from a rear chamber, control means for sequentially regulating the communication of vacuum, air at atmospheric pressure, and air above atmospheric pressure to said rear chamber for creating an operational pressure differential across said wall means with vacuum in said front chamber in response to an operational input force, said control means comprising:

hub means connected to said wall means having a housing with a bore therein, said hub means havng a first passage connecting said bore with said rear chamber, a second passage connecting said first passage with said air above atmospheric pressure, and a third passage connecting said bore with said front chamber;

first valve means located in said first passage for regulating flow communication therethrough;

second valve means located in said second passage for regulating flow communication therethrough; and plunger means located in said bore and moved in response to said input force to initially interrupt vacuum communication through said third passage and allow air at atmospheric pressure to flow into said bore past said first valve means and into said rear chamber to create a pressure differential across said wall means and upon further movement engaging said second valve means to allow air above atmospheric to flow into said rear chamber through said second passage to reinforce said created pressure differential and meet an operational demand.

2. The servomotor, as recited in claim 1, wherein said first valve means includes:
   a ball located in said first passage, said ball being adapted to move against a first seat surrounding the first passage upon said plunger means engaging said second valve means.

3. The servomotor, as recited in claim 2, wherein said first valve means further includes:
   a first resilient member located in said first passage for simulateously urging said ball against said seat and upon engagement of said plunger means with said second valve means to preventing the flow of air above atmospheric pressure from entering said bore.

4. The servomotor, as recited in claim 3, wherein said second valve means further includes:
   a stem retained in the housing of said hub means and extending into said bore, said stem having a first end and a second end; and
   a face secured to said second end, said face being adapted to move against a second seat in said second passage to prevent said air above atmospheric pressure from being communicated to said first passage.

5. The servomotor, as recited in claim 4, wherein said second valve means further includes:
   a second resilient member located in said second passage for urging said face against said second seat; and
   a beveled head located on said first end, said plunger means engaging said beveled head to overcome said second resilient member and proportion the flow of air above atmospheric pressure in said second passage into said first passaGe in a direct relationship with the movement of said plunger and the slope of the beveled head.

6. The servomotor, as recited in claim 5, wherein said plunger means includes:
   a land located between said first passage and said stem for engaging said ball and said beveled head to alternately operate said first and second valve means upon receiving said input force.

7. The servomotor, as recited in claim 6, wherein said hub means further includes:
   stop means associated with said plunger means for positioning said land over said first passage to move said ball away from said first seat and allow vacuum to be communicated from said third passage through said first passage to evacuate air from the rear chamber upon cessation of said input force.

* * * * *